(12) United States Patent
Sarlioglu et al.

(10) Patent No.: US 7,449,860 B2
(45) Date of Patent: Nov. 11, 2008

(54) CONTROL TECHNIQUE FOR LIMITING THE CURRENT OF AN INDUCTION MACHINE DRIVE SYSTEM

(75) Inventors: Bulent Sarlioglu, Torrance, CA (US); Colin Huggett, Longmont, CO (US)

(73) Assignee: Honeywell International Inc., Morristown, NJ (US)

( * ) Notice: Subject to any disclaimer, the term of this patent is extended or adjusted under 35 U.S.C. 154(b) by 541 days.

(21) Appl. No.: 11/029,941

(22) Filed: Jan. 5, 2005

(65) Prior Publication Data
US 2006/0145653 A1     Jul. 6, 2006

(51) Int. Cl.
H02P 23/00     (2006.01)

(52) U.S. Cl. .................. 318/811; 318/825

(58) Field of Classification Search .......... 318/811, 318/825
See application file for complete search history.

(56) References Cited

U.S. PATENT DOCUMENTS

| | | | | |
|---|---|---|---|---|
| 4,042,862 A | * | 8/1977 | Franklin | 318/800 |
| 4,290,001 A | * | 9/1981 | Espelage | 318/811 |
| 4,636,702 A | * | 1/1987 | Hedges | 318/729 |
| 5,247,237 A | * | 9/1993 | Koyama et al. | 318/808 |
| 5,537,308 A | * | 7/1996 | Gritter | 363/95 |
| 5,598,081 A | * | 1/1997 | Okamura et al. | 318/801 |
| 5,644,458 A | * | 7/1997 | Schoen et al. | 361/31 |
| 5,949,204 A | * | 9/1999 | Huggett et al. | 318/400.02 |
| 5,959,431 A | * | 9/1999 | Xiang | 318/811 |
| 5,973,474 A | * | 10/1999 | Yamamoto | 318/801 |
| 6,009,003 A | * | 12/1999 | Yeo | 363/37 |
| 6,194,864 B1 | * | 2/2001 | Kinpara et al. | 318/805 |
| 6,269,010 B1 | * | 7/2001 | Ma et al. | 363/35 |
| 6,301,136 B1 | * | 10/2001 | Huggett et al. | 363/95 |
| 6,636,011 B2 | * | 10/2003 | Sadasivam et al. | 318/727 |

(Continued)

FOREIGN PATENT DOCUMENTS

EP     0645879     3/1995

(Continued)

OTHER PUBLICATIONS

P. K. Kovacs, "Transient Phenomena in Electrical Machines", Elsevier Science Publishing Co., pp. 14-23 (1984).

(Continued)

*Primary Examiner*—Bentsu Ro
*Assistant Examiner*—David S Luo
(74) *Attorney, Agent, or Firm*—Oral Caglar, Esq.

(57) ABSTRACT

A method and apparatus for deriving phase voltage control signals for use in controlling current flow to an induction motor. The method may comprise obtaining an error term; converting the error term into a commanded voltage value; transforming the commanded voltage value into a commanded voltage vector; and converting the commanded voltage vector into the phase voltage control signals via pulse width modulation control. The apparatus may comprise a Park vector converter for converting a first stator phase measurement and a second stator phase measurement into a stator phase current vector; a scalar operator for obtaining a stator phase current value; a summer for obtaining an error term; an error converter for converting the error term into a commanded voltage value; a voltage transformer for transforming the commanded voltage value into a commanded voltage vector, and pulse width modulation control for converting the commanded voltage vector into the phase voltage control signals.

35 Claims, 11 Drawing Sheets

U.S. PATENT DOCUMENTS

| | | | |
|---|---|---|---|
| 7,045,988 B2 * | 5/2006 | Ha et al. | 318/807 |
| 2002/0060547 A1 * | 5/2002 | Jung | 318/701 |
| 2003/0015988 A1 * | 1/2003 | Giuseppe | 318/727 |
| 2004/0007995 A1 * | 1/2004 | Fu | 318/254 |
| 2004/0145356 A1 * | 7/2004 | Kalman et al. | 322/46 |
| 2005/0001583 A1 * | 1/2005 | Hinkkanen | 318/807 |
| 2005/0146306 A1 * | 7/2005 | Ha et al. | 318/807 |

FOREIGN PATENT DOCUMENTS

| | | |
|---|---|---|
| EP | 0921632 | 6/1999 |
| EP | 1492224 | 12/2004 |

OTHER PUBLICATIONS

International Search Report dated Jun. 29, 2006.

* cited by examiner

CONTROL TECHNIQUE FOR LIMITING THE CURRENT OF AN INDUCTION MACHINE DRIVE SYSTEM

BACKGROUND OF THE INVENTION

The present invention generally relates to systems powered by an induction machine and, more specifically, to a method for protecting induction machines and its drive system from overcurrent.

Traditional aircraft power distribution systems employ a constant-frequency source of AC power in the distribution network. Electrical motors may be directly coupled to the AC bus with the result that there can be a large inrush of current at the start up. As electric control systems for aircraft become reality, for example, it is contemplated that the conventional constant-frequency AC bus used in the aircraft will likely be replaced by a variable-frequency electrical system. However, for a variable-frequency system it would not be feasible to directly couple an electrical machine to the variable frequency AC bus. A preferred configuration is to connect electrical equipment to the AC bus via a rectification and inverter system. As a consequence, for aircraft that utilize constant-voltage, variable-frequency distribution systems, it is desirable to minimize the weight and the size (i.e., the KVA rating) of the inverter so as to minimize the weight and cost of the distribution system.

Figure 1:
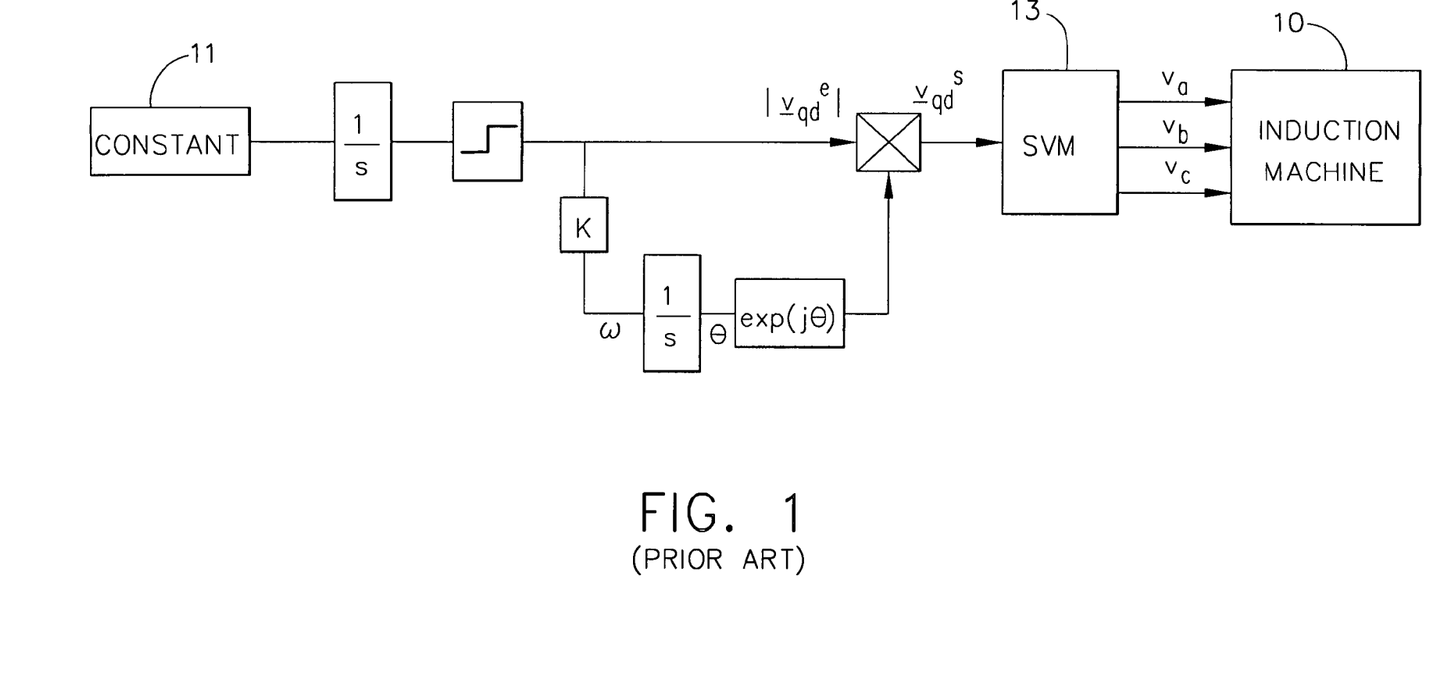
FIG. 1 is a control block diagram of a conventional induction machine controller, according to the prior art.

When a linear ramp of the magnitude of the voltage with respect to frequency, a parameter commonly expressed in constant Volts per Hertz (Volts/Hz), is applied to an induction motor, it has been observed that the magnitude of the phase current does not remain constant. One of the chief reasons for this phenomenon is the observation that the slip frequency does not remain constant. FIG. 1 is a control block diagram of a conventional open-loop method of powering an induction machine 10 via a pulse width modulation operation 13. An input 11 is applied as a constant input voltage to frequency. This voltage rate of change is kept constant until the frequency reaches a desired steady state value. For applications where a rapid acceleration is required, the magnitude of the current drawn by the motor is not controlled and, hence can vary. In some instances, the variation in current can be very large. Accordingly, the induction machine system may be configured to accommodate large current levels such as by, for example, increasing the ratings of components such as Insulated Gate Bipolar Transistors (IGBT) used in the system inverter design.

For applications where rapid acceleration is required, the current drawn from an inverter (not shown) may become quite large compared to its nominal operating points. A nominal operating point may be defined, for example, as a peak power point at which the induction machine 10 is operating at its rated maximum speed and maximum torque. To accommodate this current demand, the rating of the inverter is typically designed for a worst case operating condition in which the current demand is a multiple of the steady state rating. The magnitude of the phase current could be dependent upon many factors including the ambient air temperature, altitude (i.e., air pressure), and load torque. For example, when a 'fan' load is applied to the induction machine 10, that is, a load in which torque increases as a square of the speed of the induction machine 10, the torque of the induction machine 10 will drop as a function of decreasing air pressure. Hence it is quite desirable to design a system where the inverter current rating is limited to a certain value during the acceleration to prevent the current reaching very high values.

U.S. Pat. No. 5,247,237 discloses an open-loop control device for protecting an induction motor from overcurrent. In a basic mode of control, the control device selects a rate of change of frequency that serves to limit the acceleration of the induction motor and acts to maintain the motor current below a limit value. If the current exceeds this limit value, a correction frequency is calculated and subtracted from an open loop frequency detected in a primary frequency command generator. Based on the corrected frequency, a voltage calculation is made and an appropriate command is provided to a power conversion circuit. However, an operator is required to select an arbitrary frequency ramp rate for the device of the '237 patent.

Such conventional control methods suffer from the shortcoming that the primary control variable is not designed to accelerate a machine at the maximum rate compatible with the load that is applied to the induction motor and with the capabilities of the inverter. What is needed is a method that can be utilized under all load conditions and applied voltage conditions using the full current capability of the inverter, regardless of the load that is applied to the motor.

As can be seen, there is a need for an improved apparatus and method for limiting the current of an induction motor placed under an acceleration demand.

SUMMARY OF THE INVENTION

In one aspect of the present invention, a method of deriving phase voltage control signals for use in controlling current flow to an induction motor comprises subtracting a stator phase current magnitude value from a commanded current magnitude value to obtain an error term; converting the error term into a commanded voltage magnitude value in a synchronous reference frame; transforming the commanded voltage magnitude value into a commanded voltage vector in a stationary reference frame; and converting the commanded voltage vector into the phase voltage control signals via a pulse width modulation control.

In another aspect of the present invention, a method of deriving phase voltage control signals comprises obtaining a first stator current measurement for a first phase of an induction motor; obtaining a second stator current measurement for a second phase; transforming the first and second stator current measurements into a stator phase current magnitude value via a Park vector transformation; deriving the magnitude of the stator phase current Park vector and subtracting the stator phase current Park vector magnitude value from a commanded current Park vector magnitude value to obtain an error term; operating on the error term to obtain a terminal voltage signal in a synchronous reference frame; transforming the commanded voltage magnitude value into a commanded voltage vector in a stationary reference frame; and converting the commanded voltage vector into the phase voltage control signals via a pulse width modulation control.

In yet another aspect of the present invention, a method of deriving phase voltage control signals comprises subtracting a stator phase current Park vector magnitude value from a commanded current Park vector magnitude value to obtain an error term; operating on the error term to obtain a terminal signal; summing an input parameter with the terminal signal to obtain a terminal sum; integrating the error signal to obtain a commanded voltage magnitude value in synchronous reference frame; obtaining an electrical angle by multiplying the commanded voltage value by a constant to obtain a rotational frequency value and integrating the rotational frequency value; generating a unit vector as a function of the electrical angle; multiplying the commanded voltage magnitude value by the unit vector to yield a commanded voltage vector in stationary reference frame; converting the commanded voltage vector into the phase voltage control signals via a pulse width modulation control; obtaining from an induction motor a first stator current measurement for a first phase and a second stator current measurement for a second phase; transforming the first and second stator current measurements into a stator phase current Park vector in a stationary reference frame; generating a complex exponential term as a function of the electrical angle; multiplying the stator phase current Park vector in stationary reference frame by the complex exponential term to yield a stator phase current Park vector in synchronous reference frame; and obtaining the magnitude of the stator phase current Park vector in the synchronous reference frame to produce the stator phase current Park vector magnitude value.

In still another aspect of the present invention, a method of deriving phase voltage control signals comprises obtaining a first stator current measurement for a first phase of the induction motor, a second stator current measurement for a second phase, and a third stator current measurement for a third phase; transforming the first, second, and third stator current measurements into a stator phase current Park vector in a stationary reference frame; multiplying the stator phase current Park vector in the stationary reference frame by a complex exponential term to yield a stator phase current Park vector in synchronous reference frame; obtaining the magnitude of the stator phase current Park vector in the synchronous reference frame to yield a stator phase current magnitude value; subtracting the stator phase current Park vector magnitude value from a commanded current value to obtain an error term; operating on the error term via a proportional integral differential regulator to obtain a terminal voltage signal; transforming the commanded voltage magnitude value into a commanded voltage vector in stationary reference frame; and converting the commanded voltage vector into the phase voltage control signals via a pulse width modulation control.

In accordance with a further aspect of the present invention, a controller suitable for providing phase voltage control signals to an induction motor comprises a Park vector converter for converting a first stator measurement of a first phase of the induction motor and a second stator measurement of a second phase of the induction motor into a stator phase current Park vector; a scalar operator for obtaining the magnitude of the stator phase current Park vector to yield a stator phase current Park vector magnitude value; a summer for subtracting the stator phase Park vector current value from a commanded current Park vector value to obtain an error term; an error converter for converting the error term into a commanded voltage Park vector magnitude value in synchronous reference frame; a voltage transformer for transforming the commanded voltage magnitude value into a commanded voltage vector in a stationary reference frame; and a pulse width modulation control for converting the commanded voltage vector into the phase voltage control signals.

In still a further aspect of the present invention, an induction machine drive system comprises an induction motor having a first current sensor for measuring a first stator phase current and a second current sensor for measuring a second stator phase current; an inverter for transmitting power from a DC link to the induction motor; a controller for receiving a first stator current measurement from the first current sensor and a second stator current measurement from the second current sensor, the controller including a Park vector converter for converting the first stator current measurement and the second stator current measurement into a stator phase current Park vector; a scalar operator for obtaining the magnitude of the stator phase current Park vector to yield a stator phase current value; a voltage vector generator for producing a commanded voltage vector as a function of the stator phase current value and a commanded current magnitude value; a pulse width modulation control for producing a plurality of phase voltage control signals from the commanded voltage vector; and a gate drive for converting the plurality of phase voltage control signals into a control signal for the inverter.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method and apparatus for deriving phase voltage control signals for use in controlling power provided to an induction motor such as may be found in an electrical control system of an aircraft. In the present state of the art, a control system for an induction machine drive system may include an open-loop configuration which supplies a linear ramp input, measured in constant Volts per Hertz, to the electrical load via an inverter. Under operating conditions in which a rapid acceleration is required, the resultant current demand on the inverter may become very large. Accordingly, the rating of the inverter may be designed for a worst-case condition much greater than the steady-state rating of the inverter to accommodate such operating conditions. This design solution, however, results in a larger, heavier, and more expensive inverter. The present invention provides a closed-loop control system which generates a stator phase current Park vector to derive an error term for feedback. The current provided to the inverter is limited in accordance with a commanded current reference value provided to the control system.

Figure 2:
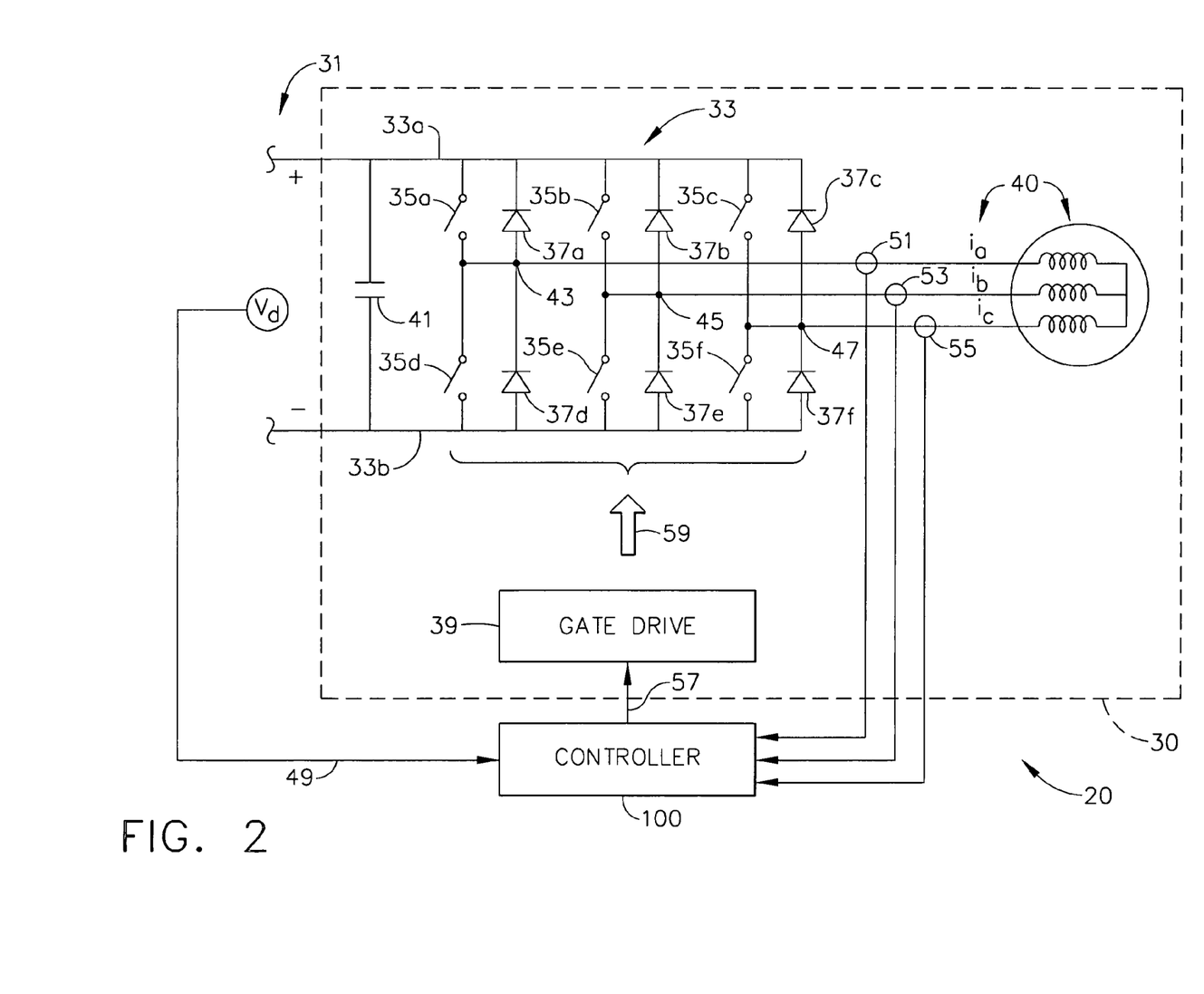
FIG. 2 is a representative diagram of an induction machine drive system including an inverter and induction motor operated by a controller in accordance with the present invention.

In one embodiment of the present invention, shown in the representative diagram of FIG. 2, an induction machine drive system 20 may operate via power supplied via a DC link 31. DC link voltage $V_d$ supplied by the DC link 31 may be provided to an inverter 33, where the inverter 33 may be a three-phase bridge inverter comprising a set of upper semiconductor switches 35a-c and a set of lower semiconductor switches 35d-f. Each switch 35a-f may be associated with a controllable solid-state device (not shown) such as a MOSFET or an IGBT. Anti-parallel diodes 37a-f may comprise part of respective solid state devices. The DC link 31 may include a capacitor 41 across inverter input ports 33a and 33b to provide a low-source impedance for the inverter 33 and to reduce voltage ripple on the DC link 31.

The inverter 33 may transmit power from the DC link 31 to an induction motor 40 via a first phase output port 43, a second phase output port 45, and a third phase output port 47. A controller 100 may measure a first phase current $i_a$ at the first phase output port 43 by means of a first current sensor 51. Similarly, the controller 100 may measure a second phase current $i_b$ at the second phase output port 45 by means of a second current sensor 53, and a third phase current $i_c$ at the third phase output port 47 by means of a third current sensor 55.

The controller 100 may output a control signal 57 to a gate drive 39 which may produce a plurality of gate signals 59 to turn the semiconductor switches 35a-f on and off in the inverter 33, as may be provided in an induction machine drive assembly 30. The gate drive 39 may convert the control signal 57 into the plurality of gate signals 59 which may control the switches 35a-f and provide the phase voltages, denoted by $V_a$, $V_b$, and $V_c$ in FIG. 3 below, to the induction motor 40. A link voltage $V_d$ reading may be provided to the controller 100 via a DC link sense line 49.

Operation of the controller 100 can be described with reference to the control block diagram of FIG. 3 and a flow diagram 99 shown in FIG. 4. A first phase current reading 85, a second phase current reading 87, and a third phase current reading 89 may be sent to a Park vector convertor 91 to produce a stator phase current Park vector in stationary reference frame $i_{qd}^s$, at step 101.

Park vectors include information on the instantaneous magnitudes and the phase relationship of three phase rotating fields with respect to a reference coordinate system. A Park vector, in general, is a mathematical representation that describes the locus of an electrical quantity in the complex space domain (where time is a parameter). A current Park vector is defined with the amplitude of the vector and the direction of the vector in spatial relation to the three phases. A general discussion of Park vectors is provided in P. K. Kovacs, "Transient Phenomena in Electrical Machines," Elsevier Science Publishing Co. (1984), incorporated herein by reference.

The stationary stator phase current Park vector $\vec{i}_{qd}^s$ may be constructed using the respective first phase current reading 85, second phase current reading 87, and third phase current reading or calculated value 89. The stationary stator phase current Park vector can be mathematically represented by the expression, $$\underline{i}_{qd}^s = \frac{2}{3}(i_a + ai_b + a^2 i_c) = i_q^s - j i_d^s$$

where, $$i_q^s = \frac{2}{3}[i_a - 0.5(i_b + i_c)]$$

$$i_d^s = -\frac{2}{3} * 0.866(i_b - i_c)$$

and where $$a = e^{j\frac{2\pi}{3}}$$

and $$a^2 = e^{-j\frac{2\pi}{3}}.$$

The magnitude of the stationary stator phase current Park vector $i_{qd}^s$ may be obtained via a scalar operator 97 to yield an initial synchronous stator phase current vector magnitude $|i_{qd}^s|$, at step 103, which may be sent to an error summer 61.

An error term $\epsilon$, given in Amperes, may then be obtained by subtracting the stationary reference frame stator phase current Park vector magnitude $|i_{qd}^s|$ from a commanded current reference value $|i_{qd}^s|_{cmd}$ via the error summer 61, at step 105. The error term $\epsilon$ may be inputted to a regulator 64, which limits input signal voltage. The output of the regulator 64, a terminal voltage signal, may also be bounded by a limiter 73 to produce a commanded voltage in synchronous reference frame $|v_{qd}^e|$, at step 107.

An electrical angle $\theta$ may be obtained by multiplying the synchronous commanded voltage magnitude value $|v_{qd}^e|$ with a specific machine-dependent constant K via the frequency multiplier 75 to obtain the frequency $\omega$, and integrating the frequency $\omega$, via the frequency integrator 77. The electrical angle $\theta$ may be sent to the exponential operator 79 to form the corresponding unit vector ($e^{j\theta}$). The unit vector ($e^{j\theta}$) may be transformed, via a vector multiplier 81, with the synchronous commanded voltage $|v_{qd}^e|$, at step 109, to produce a commanded voltage Park vector in stationary reference frame $v_{qd}^s$. The stationary commanded voltage Park vector $v_{qd}^s$ may then be provided to a pulse width modulation control 84 to produce a control signal 57, at step 111.

Figure 5:
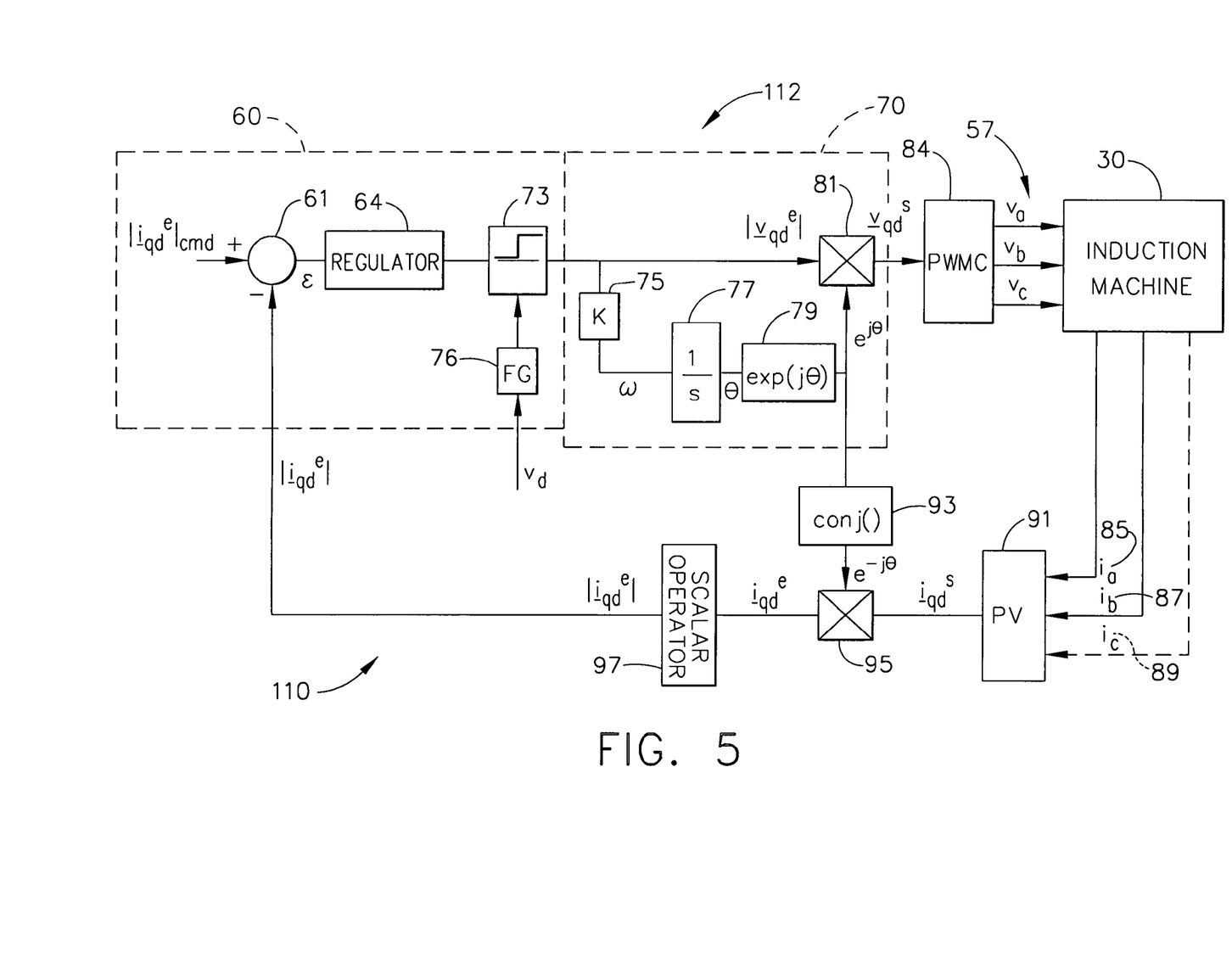
FIG. 5 is a control block diagram of another embodiment of an induction machine controller in accordance with the present invention.
Figure 6:
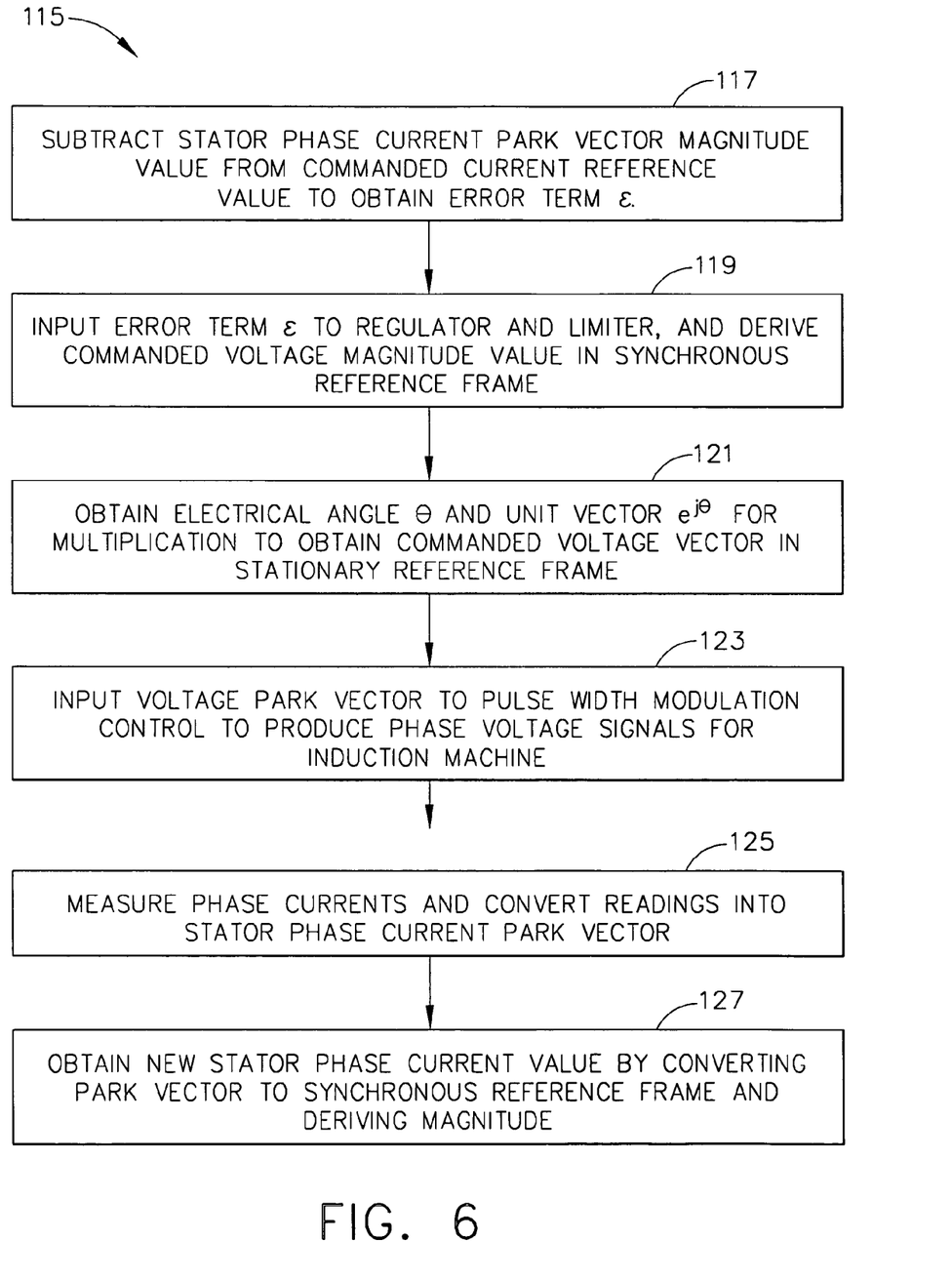
FIG. 6 is a flow diagram describing operation of the induction machine controller of FIG. 5.

In another embodiment of the present invention, shown in the control block diagram of FIG. 5 and a flow diagram 115 shown in FIG. 6, the error term $\epsilon$ may be obtained by subtracting the synchronous stator phase current Park vector magnitude value $|i_{qd}^e|$ from the commanded current reference value $|i_{qd}^e|_{cmd}$ via the error summer 61, at step 117. The error term $\epsilon$ may be inputted to a regulator 64, which may be a proportional integral regulator, for example. The output of the regulator 64 comprises a terminal voltage signal in Volts and may be bounded by the limiter 73 to produce the commanded voltage in synchronous reference frame $|v_{qd}^e|$, at step 119. The limiter 73 may comprise a varying limit term, provided via the function generator 76, such as a function of another variable or an input to the controller 110, such as the DC link voltage $V_D$. The error summer 61, the regulator 63, the limiter 73, and the function generator 76 form an error converter section 60.

The unit vector ($e^{j\theta}$) may be transformed, via the vector multiplier 81, with the synchronous commanded voltage |

$v_{qd}{}^e|$, at step 121, to produce the commanded voltage vector in stationary reference frame $\vec{v}_{qd}{}^s$.

The stationary frame commanded voltage vector $\vec{v}_{qd}{}^s$ may be provided to a pulse width modulation control 84 to produce the control signal 57 sent to the induction machine 30, at step 123. The first phase current reading 85, the second phase current reading 87, and the third phase current reading 89 may be sent to the Park vector converter 91 to produce the stator phase current Park vector in stationary reference frame $\vec{i}_{qd}{}^s$, at step 125.

A conjugate operator 93 transforms the unit vector ($e^{j\theta}$) into a conjugate ($e^{-j\theta}$). The conjugate ($e^{-j\theta}$) may be multiplied with the stationary stator phase current Park vector $\vec{i}_{qd}{}^s$ via a current multiplier 95 to produce a stator phase current Park vector in synchronous reference frame $\vec{i}_{qd}{}^e$.

The magnitude of the synchronous stator phase current Park vector $\vec{i}_{qd}{}^e$ may be obtained via the magnitude or scalar operator 97 to yield the synchronous stator phase current Park vector value $|i_{qd}{}^e|$, at step 127, which may then be sent to the error summer 61. The error converter section 60 and the voltage transformer section 70 form a voltage Park vector generator 112.

Figure 7:
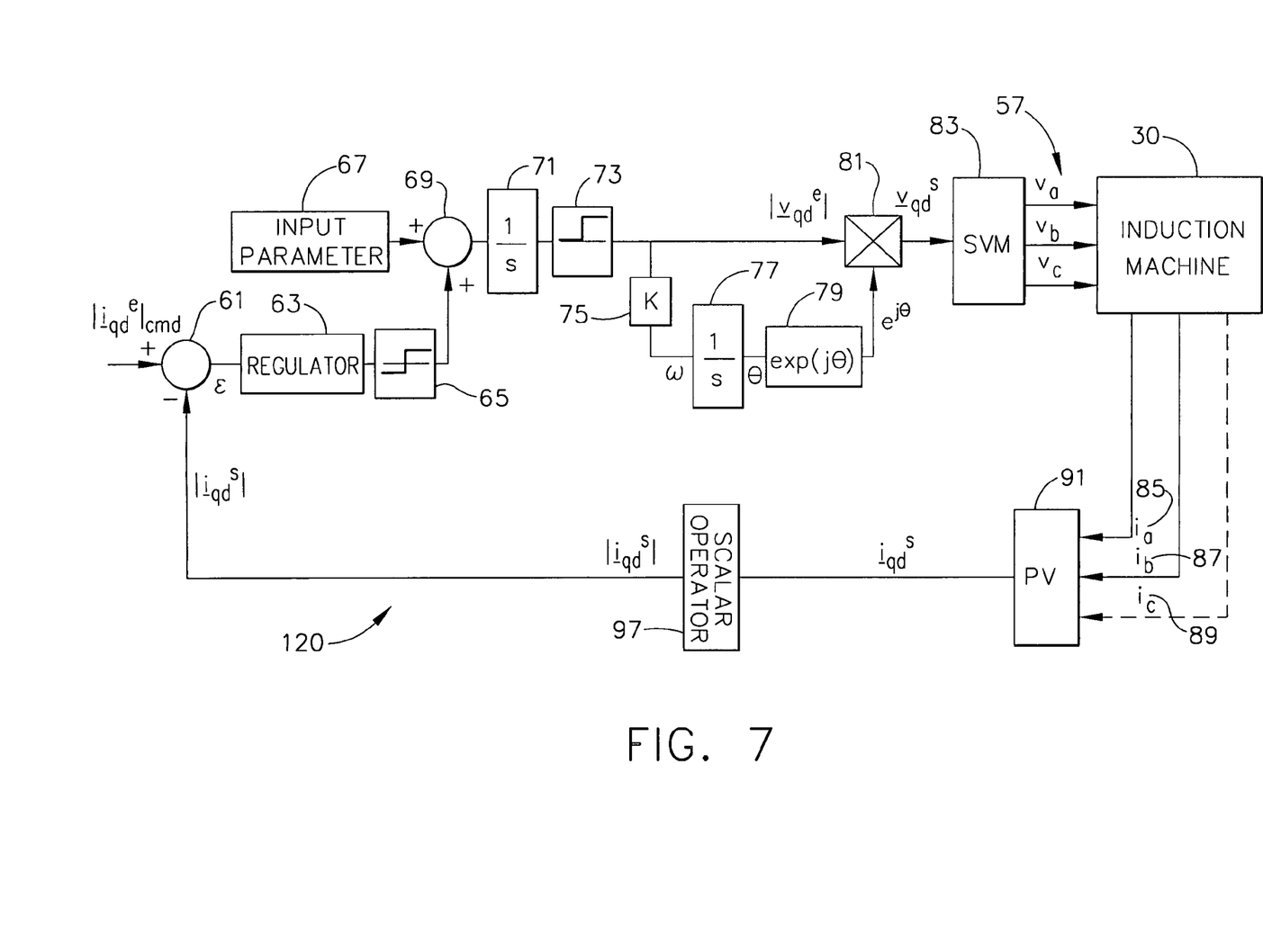
FIG. 7 is a control block diagram of yet another embodiment of an induction machine controller in accordance with the present invention.
Figure 8:
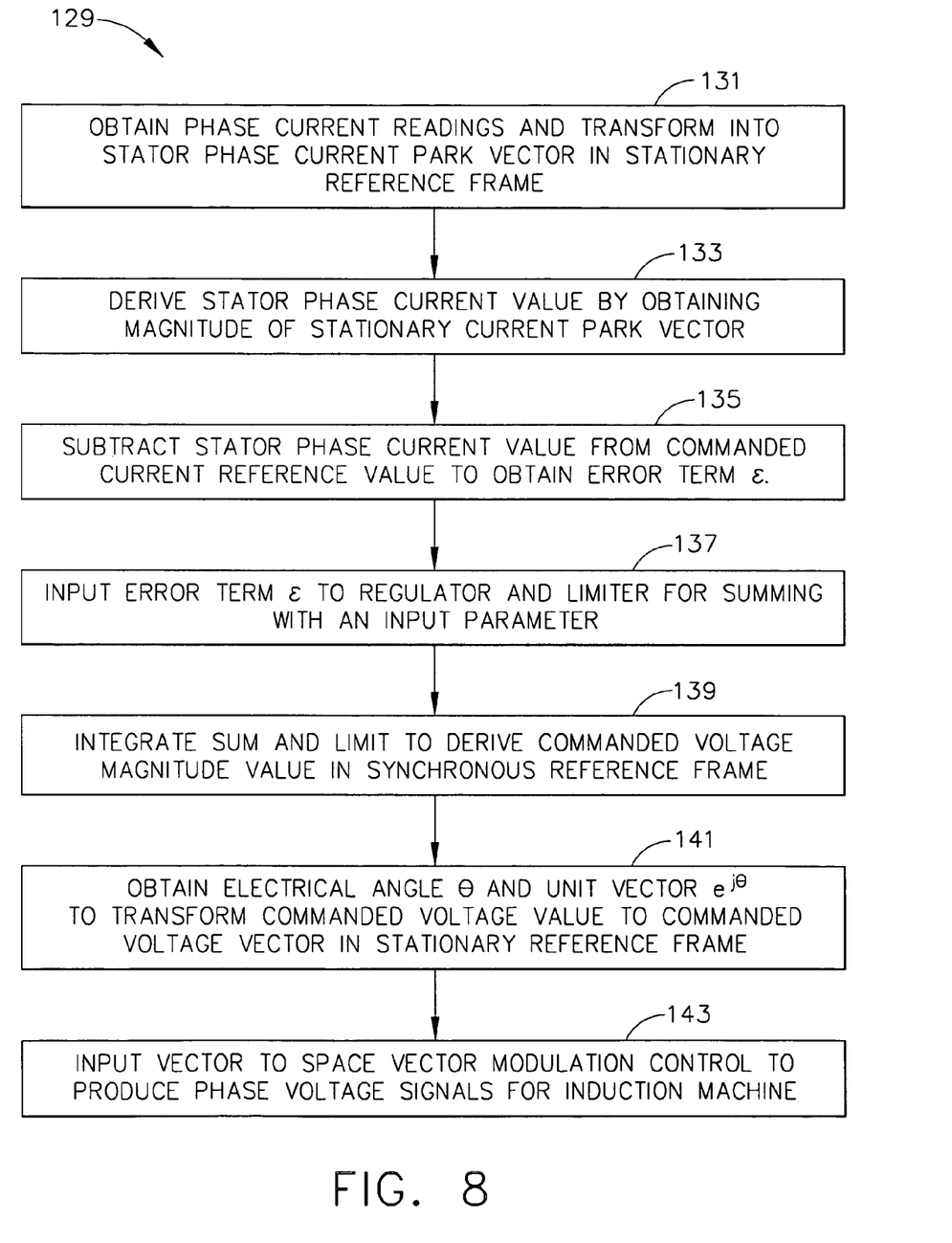
FIG. 8 is a flow diagram describing operation of the induction machine controller of FIG. 7.

In yet another embodiment of the present invention, a controller 120 operates in accordance with a control block diagram shown in FIG. 7 and a flow diagram 129 shown in FIG. 8. The first, second, and third phase current readings 85, 87, and 89 may be obtained using respective current sensors 51, 53, 55 and sent to the Park vector converter 91 to produce the stator phase current Park vector in stationary reference frame $\vec{i}_{qd}{}^s$ at step 131. The magnitude of the stationary stator phase current Park vector $\vec{i}_{qd}{}^s$ may be obtained, via the scalar operator 97 to yield an initial stationary stator phase current Park vector magnitude value $|i_{qd}{}^s|$, at step 133, which may be sent to the error summer 61.

The error term $\epsilon$, which is given in Amperes, may be obtained by subtracting the stationary stator phase current Park vector magnitude value $|i_{qd}{}^s|$ from the commanded current reference value $|i_{qd}{}^e|_{cmd}$ via the error summer 61, at step 135. The error term $\epsilon$ may then be inputted to the proportional integral regulator 63. The regulator output, a terminal Volts per Hertz signal, may then be bounded by the limiter 65, and the result may be summed with the input parameter 67 via the converter summer 69 to produce a signal/parameter sum, at step 137.

The resulting signal/parameter sum may be integrated via the converter integrator 71, which outputs a signal in Volts, and bounded by the limiter 73 to produce a commanded voltage in synchronous reference frame $|v_{qd}{}^e|$, at step 139. The electrical angle $\theta$ may be obtained by multiplying the synchronous commanded voltage $|v_{qd}{}^e|$ by a specific machine-dependent constant K via the frequency multiplier 75 to obtain the rotational frequency $\omega$, and integrating the frequency $\omega$, via the frequency integrator 77. The electrical angle $\theta$ may be sent to the exponential operator 79 to form the corresponding unit vector ($e^{j\theta}$). The unit vector ($e^{j\theta}$) may be transformed, via the vector multiplier 81, with the synchronous commanded voltage $|v_{qd}{}^e|$, at step 141, to produce the commanded voltage vector in stationary reference frame $\vec{v}_{qd}{}^s$.

The stationary commanded voltage vector $\vec{v}_{qd}{}^s$ may then be provided to a pulse width modulation control such as by using the space vector modulation 83 to produce the control signal 57, at step 143.

Figure 9:
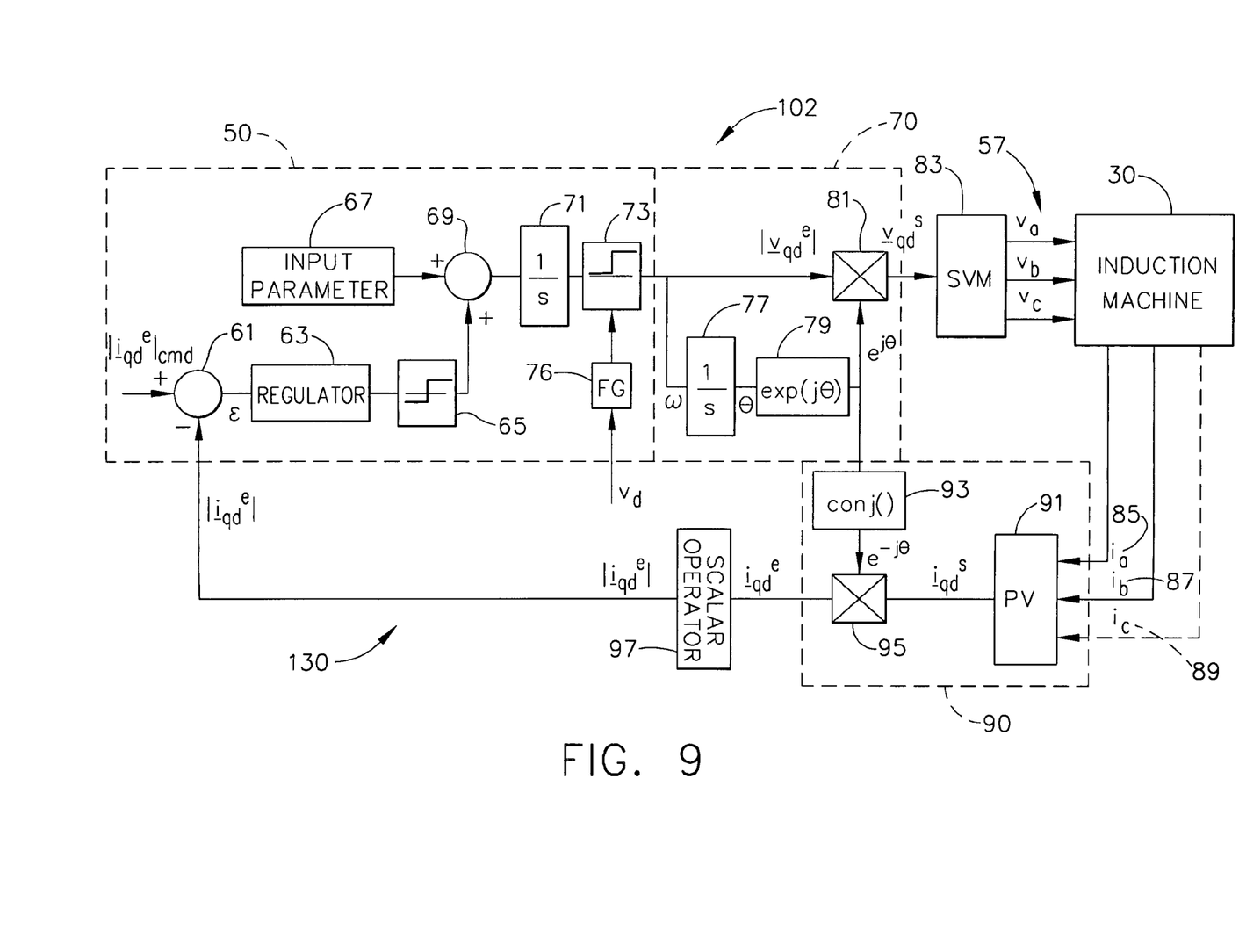
FIG. 9 is a control block diagram of still another embodiment of an induction machine controller in accordance with the present invention.
Figure 10:
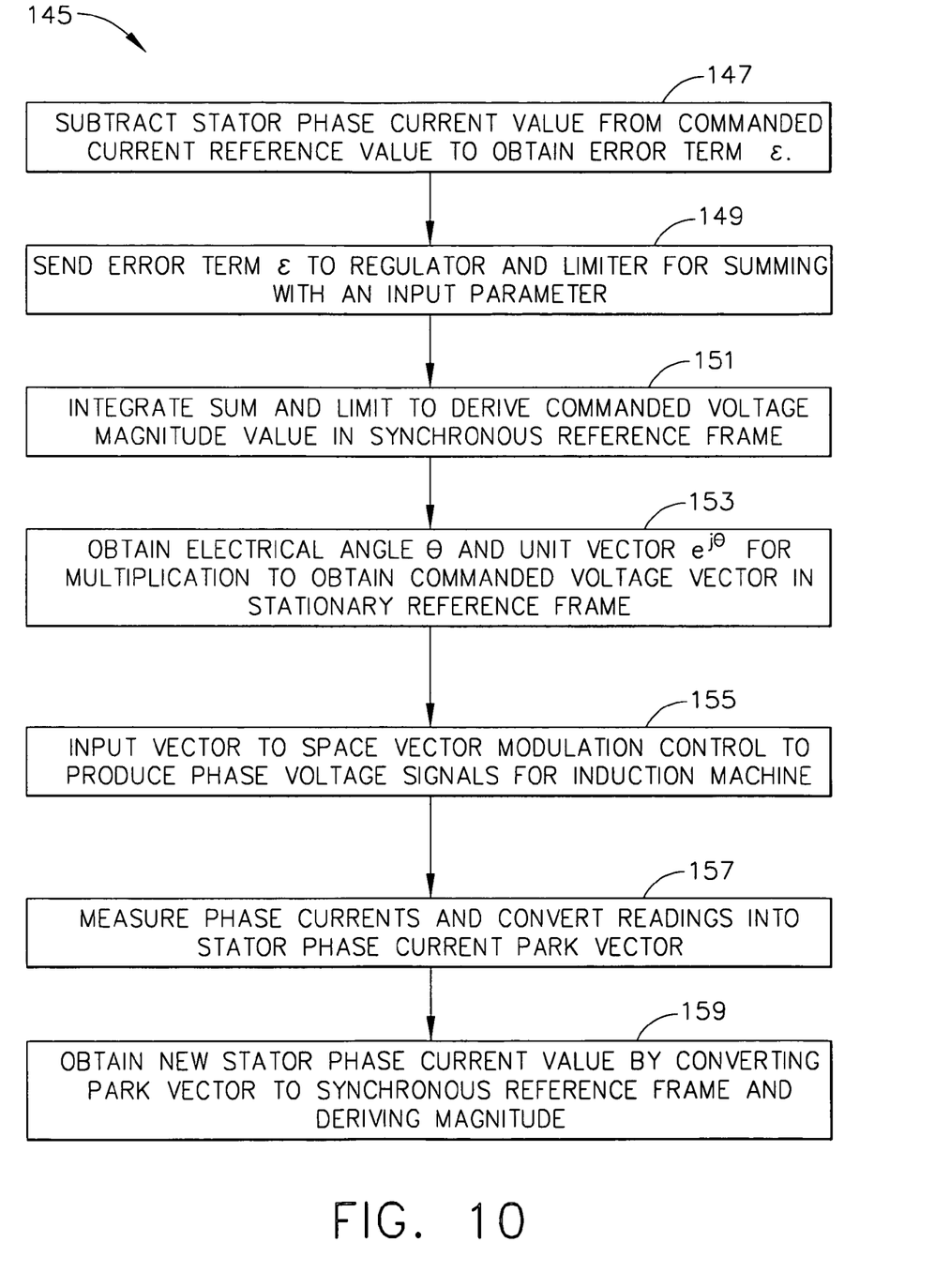
FIG. 10 is a flow diagram describing operation of the induction machine controller of FIG. 9.

In still another embodiment of the present invention, shown in the control block diagram of FIG. 9 and the flow diagram 145 shown in FIG. 10, an error term $\epsilon$ may be obtained by subtracting the synchronous stator phase current Park vector magnitude value $|i_{qd}{}^e|$ from the commanded current reference value $|i_{qd}{}^e|_{cmd}$ via the error summer 61, at step 147. The commanded current reference value $|i_{qd}{}^e|_{cmd}$ may be inputted to provide the desired current limit for the inverter 33. The error term $\epsilon$ may be inputted to the regulator 63, which may be a proportional integral regulator, for example.

The output of the regulator 63 comprises a terminal Volts/Hz signal and may be bounded by the optional limiter 65, whereby the result may be summed with the input parameter 67 via the converter summer 69, at step 149, to obtain a terminal Volts/Hz sum. The output of the converter summer 69 is a Volts/Hz command in the synchronous reference frame. The input parameter 67 (provided in Volts/Hz) may be a constant value, or may be a variable parameter. Alternatively, the input parameter 67 may be a variable value which is a function of another time-dependent variable, or the input parameter may be a variable value which is event-driven.

The error summer 61, the regulator 63, the limiter 65, and the converter summer 69 may form the basic regulator for the controller 100 such that the magnitude of the current in the induction machine 30 can be regulated. The terminal Volts/Hz sum may be integrated, via a converter integrator 71 to produce a terminal voltage parameter, and may be bounded by the optional limiter 73 to produce a commanded voltage value in synchronous reference frame $|v_{qd}{}^e|$, at step 151. The error summer 61, the regulator 63, the limiter 65, the converter summer 69, the converter integrator 71, the limiter 73, and an optional function generator 76 form an error converter section 50. The operation of the limiter 73 may be controlled by the function generator 76, which sets the upper bound of the limiter 73 in accordance with an input parameter, such as the DC link voltage $V_d$. It can be appreciated by one skilled in the relevant art that this configuration functions to minimize the occurrence of integrator wind-up.

The electrical angle $\theta$ may be obtained by integrating the electrical frequency $\omega$ via the frequency integrator 77. The electrical angle $\theta$ may be sent to the exponential operator 79 to form the corresponding unit vector ($e^{j\theta}$). The unit vector ($e^{j\theta}$) may be transformed, via the vector multiplier 81, with the synchronous commanded voltage $|v_{qd}{}^e|$, at step 153, to produce the commanded voltage vector in stationary reference frame $\vec{v}_{qd}{}^s$. The frequency multiplier 75, the frequency integrator 77, the exponential operator 79, and the vector multiplier 81 may form a voltage transformer section 70.

The stationary commanded voltage vector $\vec{v}_{qd}{}^s$ may be provided to a pulse-width modulation (PWM) operation, such as the space vector modulation (SVM) control 83, to produce the control signal 57 which comprises phase voltage control signals $V_a$, $V_b$, and $V_c$ sent to the induction machine 30, at step 155. The first phase current reading 85 (denoted by $i_a$), the second phase current reading 87 (denoted by $i_b$), and the optional third phase current reading 89 (denoted by $i_c$) may be obtained using respective first, second, and optional third current sensors 51, 53, 55 (see FIG. 2) and sent to the Park vector convertor (PV) 91 to produce the stator phase current Park vector in stationary reference frame $\vec{i}_{qd}{}^s$, at step 157.

Figure 3:
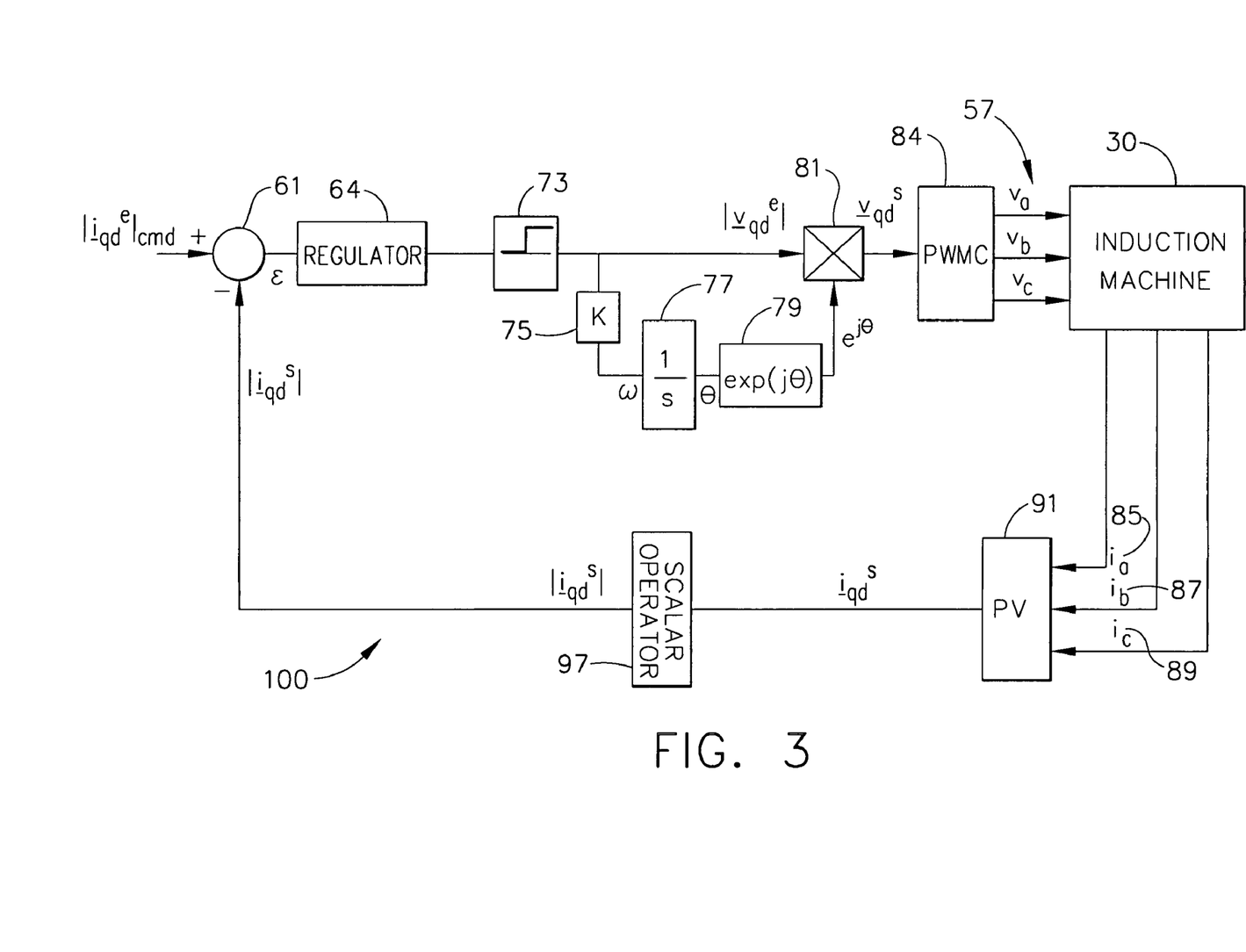
FIG. 3 is a control block diagram of an induction machine controller in accordance with the present invention.
Figure 4:
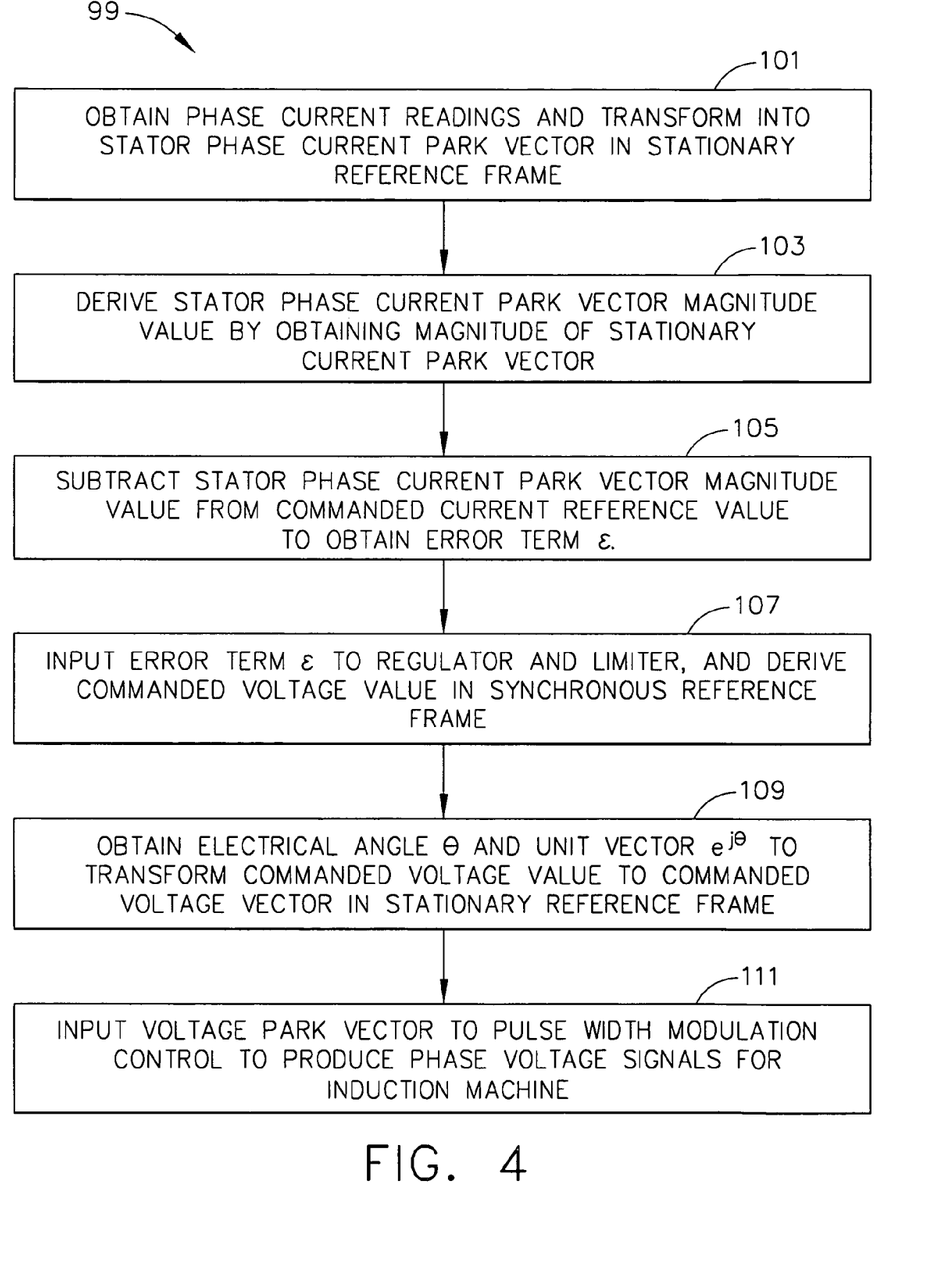
FIG. 4 is a flow diagram describing operation of the induction machine controller of FIG. 3.

It can be appreciated by one skilled in the relevant art that number of calculation steps required to obtain a stator phase current value for input to the error summer 61 are fewer in the embodiments of FIGS. 3 and 7, which input the stationary reference frame current Park vector to the scalar operator 97 instead of a synchronous reference frame current Park vector. This can be done in the previous embodiments because the magnitude of the stationary stator phase current value ($|i_{qd}^s|$) is the same as the magnitude of the synchronous stator phase current value ($|i_{qd}^e|$).

In an alternative embodiment, only the first phase current reading 85 and the second phase current reading 87 are obtained from the induction machine 30 to reduce the number of current readings taken from three to two. In the alternative embodiment, the Park vector convertor 91 includes a current magnitude value generator (not shown) for calculating the third phase current reading 89 (here shown in phantom) from the first phase current reading 85 and the second phase current reading 87. It should be understood that the disclosed methods require that the 'neutral' of the induction machine 30 is galvanically isolated from the inverter circuitry.

The conjugate operator 93 may transform the unit vector ($e^{j\theta}$) into a complex exponential term, such as a conjugate ($e^{-j\theta}$). The conjugate ($e^{-j\theta}$) may be multiplied with the stationary stator phase current Park vector $i_{qd}^s$ via the current multiplier 95 to produce a stator phase current Park vector in synchronous reference frame $i_{qd}^e$. The Park vector convertor 91, the conjugate operator 93, and the current multiplier 95 may form a Park vector converter section 90.

The magnitude of the synchronous stator phase current Park vector $i_{qd}^e$ may be obtained via a magnitude operator, such as the scalar operator 97, by taking the square root of the sum of the squares of the d- and q-axis currents, to yield a new synchronous stator phase current value $|i_{qd}^e|$, at step 159, which may then be sent to the error summer 61. The error converter section 50 and the voltage transformer section 70 may form a voltage vector generator 102.

Figure 11:
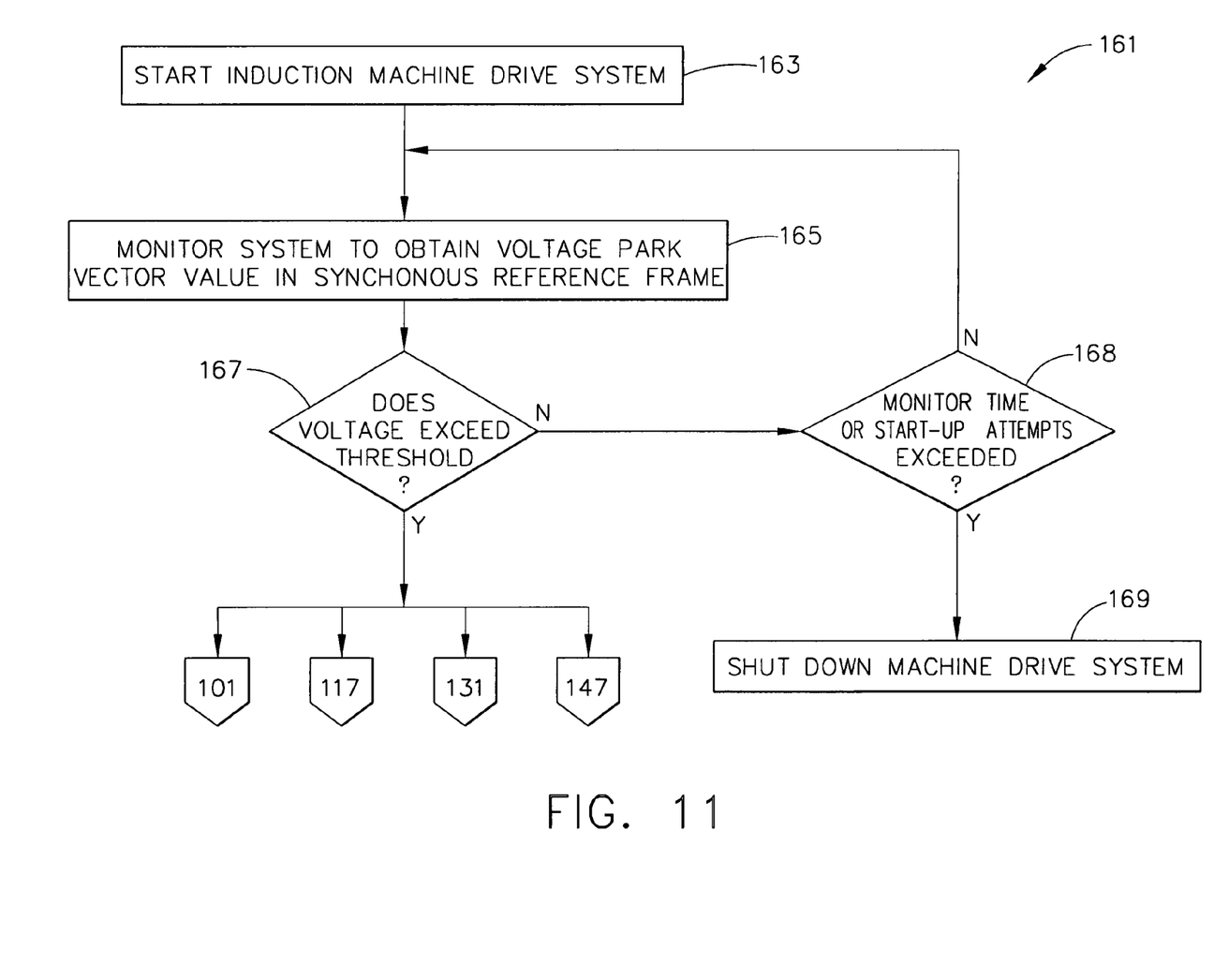
FIG. 11 is a flow diagram describing a failure mode checking operation performed prior to the operations represented by the flow diagrams of FIGS. 4, 6, 8, and 10.

The induction machine drive system 20 may also include a provision for shutting down power to the induction motor 40 in the event of a motor failure, for example, a locked rotor. A flow diagram 161, in FIG. 11, shows that after the induction machine drive system 20 has been started, at step 163, the commanded voltage value $|v_{qd}^e|$ may be monitored to obtain the voltage Park vector value in synchronous reference frame, at step 165. If the result of step 165 indicates that the commanded terminal voltage $|v_{qd}^e|$ has failed to rise above a predetermined threshold value for a predetermined length of time or for a predetermined number of start-up attempts, at decision block 167, the induction machine drive system 20 may shut down to prevent damage, at step 169. The shut down operation may be initiated after monitoring has been conducted either for a predetermined length of time or for a predetermined number of measurement attempts, as indicated by decision block 168.

If the predetermined length of time or the predetermined number of start-up attempts has not been exceeded, at decision block 168, operation returns to step 165 in which the commanded terminal voltage $|v_{qd}^e|$ continues to be monitored. If the terminal voltage $|v_{qd}^e|$ exceeds the threshold, at decision block 167, this may be taken as an indication that the induction machine drive system 20 is operating properly, and operation proceeds either: to step 101 of the flow diagram 99, to step 117 of the flow diagram 115, to step 131 of the flow diagram 129, or to step 147 of the flow diagram 145.

It should be understood, of course, that the foregoing relates to preferred embodiments of the invention and that modifications may be made without departing from the spirit and scope of the invention as set forth in the following claims.

We claim:

1. A method of deriving phase voltage control signals suitable for use in controlling current flow to an induction motor, said method comprising the steps of:
    subtracting a stator phase current value from a commanded current value to obtain an error term;
    converting said error term into a commanded voltage value in synchronous reference frame;
    transforming said commanded voltage value into a commanded voltage vector in stationary reference frame; and
    converting said commanded voltage vector into the phase voltage control signals via a pulse width modulation control;
    wherein said stator phase current value comprises a value derived from a stator phase current Park vector stationary reference frame.

2. The method of claim 1 wherein said a stator phase current value is derived from a stator phase current Park vector in synchronous reference frame.

3. The method of claim 1 wherein said commanded current value comprises a constant value.

4. The method of claim 1 wherein said commanded current value comprises a variable value.

5. The method of claim 1 wherein said step of converting said error term comprises the steps of:
    operating on said error term via a regulator to obtain a terminal signal in Volts per Hertz;
    summing an input parameter with said terminal signal to obtain a terminal sum in Volts per Hertz; and
    integrating said terminal sum to obtain said commanded voltage value in synchronous reference frame.

6. The method of claim 5 wherein said input parameter comprises a value in Volts per Hertz.

7. The method of claim 5 wherein said step of converting said error term further comprises the step of limiting an amplitude of said terminal signal.

8. The method of claim 1 wherein said step of converting said error term comprises the steps of:
    operating on said error term to obtain a terminal voltage signal; and
    limiting an amplitude of said terminal voltage signal to obtain said commanded voltage value in synchronous reference frame.

9. The method of claim 1 wherein said step of transforming said commanded voltage value comprises the steps of:
    obtaining an electrical angle;
    generating a unit vector as a function of said electrical angle; and
    multiplying said commanded voltage value by said unit vector to yield said commanded voltage vector in stationary reference frame.

10. The method of claim 1 further comprising the steps of:
    obtaining from the induction motor a first stator current measurement for a first phase of the induction motor;
    obtaining from the induction motor a second stator current measurement for a second phase of the induction motor; and
    transforming at least said first and second stator current measurements into an updated stator phase current value via a Park vector transformation.

11. The method of claim 10 further comprising the step of obtaining from the induction motor a third stator current measurement for a third phase of the induction motor.

12. The method of claim 11 wherein said step of transforming at least said first and second stator current measurements comprises the step of using said first and second stator current measurements to derive a third stator current measurement for a third phase of the induction motor.

13. The method of claim 10 wherein said step of transforming at least said first and second stator current measurements comprises the steps of:
    transforming said first and second stator current measurements into a stator phase current Park vector in stationary reference frame; and
    obtaining the magnitude of said stator phase current Park vector in stationary reference frame to yield said stator phase current value.

14. The method of claim 11 wherein said step of transforming at least said first and second stator current measurements comprises the steps of:
    transforming at least said first and second stator current measurements into a stator phase current Park vector in stationary reference frame;
    obtaining an electrical angle;
    generating a complex exponential term as a function of said electrical angle;
    multiplying said stator phase current Park vector in stationary reference frame by said complex exponential term to yield a stator phase current Park vector in synchronous reference frame; and
    obtaining the magnitude of said stator phase current Park vector in synchronous reference frame to yield said stator phase current value.

15. The method of claim 1 further comprising the step of shutting down said induction motor in response to determining that said commanded voltage value in synchronous reference frame has not exceeded a predetermined voltage threshold within a predetermined period of time.

16. The method of claim 1 further comprising the step of shutting down said induction motor after a predetermined number of monitoring measurements has failed to determine that said commanded voltage value in synchronous reference frame has exceeded a predetermined voltage threshold.

17. A method of deriving phase voltage control signals suitable for use in controlling current flow to an induction motor, said method comprising the steps of:
    obtaining a first stator current measurement for a first phase of the induction motor;
    obtaining a second stator current measurement for a second phase of the induction motor;
    transforming said first and second stator current measurements into a stator phase current value via a Park vector transformation;
    subtracting said stator phase current Park vector value from a commanded current Park vector magnitude value to obtain an error term;
    operating on said error term via a regulator to obtain a terminal signal;
    integrating said terminal signal to obtain a commanded voltage value in synchronous reference frame;
    transforming said commanded voltage value into a commanded voltage vector in stationary reference frame; and
    converting said commanded voltage vector into the phase voltage control signals via a pulse width modulation control.

18. The method of claim 17 wherein said step of integrating said terminal signal comprises the step of limiting an output voltage value.

19. The method of claim 17 wherein said step of integrating said terminal signal comprises the steps of summing an input parameter with said terminal signal to produce a signal/parameter sum and integrating said signal/parameter sum to obtain said commanded voltage value in synchronous reference frame.

20. The method of claim 17 wherein said step of transforming said commanded voltage value comprises the steps of:
    obtaining an electrical angle;
    generating a unit vector as a function of said electrical angle; and
    multiplying said commanded voltage value by said unit vector to yield said commanded voltage value in stationary reference frame.

21. A controller suitable for providing phase voltage control signals to an induction motor, said controller comprising:
    a Park vector converter for converting a first stator measurement of a first phase of the induction motor and a second stator measurement of a second phase of the induction motor into a stator phase current Park vector in stationary reference frame;
    a scalar operator for obtaining the magnitude of said stator phase current Park vector to yield a stator phase current Park vector magnitude value;
    a summer for subtracting said stator phase Park vector current value from a commanded current Park vector value to obtain an error term;
    an error converter for converting said error term into a commanded voltage Park vector magnitude value in synchronous reference frame;
    a voltage transformer for transforming said commanded voltage Park vector magnitude value into a commanded voltage vector in stationary reference frame; and
    a pulse width modulation control for converting said commanded voltage vector into the phase voltage control signals.

22. The controller of claim 21 wherein said Park vector converter comprises a current value generator for deriving a third stator current measurement for a third phase of the induction motor by using said first and second stator current measurements.

23. The controller of claim 21 wherein said Park vector converter comprises a conjugate operator for obtaining a complex exponential term from an electrical angle of said commanded voltage value.

24. The controller of claim 23 wherein said Park vector converter includes a current multiplier for multiplying said stator phase current vector in stationary reference frame by said complex exponential term to produce a stator phase current vector in synchronous reference frame.

25. The controller of claim 21 wherein said error converter comprises:
    a regulator for converting said error term into a terminal voltage signal in synchronous reference frame;
    a converter summer for adding said terminal voltage signal to an input parameter; and
    an integrator for converting an output of said converter summer into said commanded voltage value in synchronous reference frame.

26. The controller of claim 25 wherein said regulator comprises a member of the group consisting of a proportional integral differential regulator.

27. The controller of claim 21 wherein said error converter comprises:

a regulator for converting said error term into a terminal voltage signal in synchronous reference frame; and a limiter for bounding said terminal voltage signal to produce said commanded voltage value in synchronous reference frame.

28. The controller of claim 27 further comprising a function generator in communication with said limiter.

29. The controller of claim 21 wherein said voltage transformer comprises:

a frequency multiplier for multiplying said commanded voltage value in synchronous reference frame by a machine dependent constant to obtain a frequency value;

a frequency integrator for integrating said frequency value to obtain an electrical angle;

an exponential operator to generate an exponential function of said electrical angle; and a conjugate operator for multiplying said commanded voltage value with said exponential function to produce said commanded voltage vector in stationary reference frame.

30. An induction machine drive system comprising:

an induction motor having a first current sensor for measuring a first stator phase current, said induction motor further having a second current sensor for measuring a second stator phase current;

an inverter for transmitting power from a DC link to said induction motor;

a controller for receiving a first stator current measurement from said first current sensor, said controller further for receiving a second stator current measurement from said second current sensor, said controller including:

a Park vector converter for converting said first stator current measurement and said second stator current measurement into a stator phase current Park vector;

a scalar operator for obtaining the magnitude of said stator phase current Park vector to yield a stator phase current value;

a voltage vector generator for producing a commanded voltage vector as a function of said stator phase current value and a commanded current value;

a space vector modulation control for producing a plurality of phase voltage control signals from said commanded voltage vector; and a gate drive for converting said plurality of phase voltage control signals into a control signal for said inverter.

31. The induction machine drive system of claim 30 wherein said voltage vector generator comprises:

an error converter for converting said stator phase current value and said commanded current value into a commanded voltage value in synchronous reference frame; and a voltage transformer for transforming said commanded voltage value into a commanded voltage vector in stationary reference frame.

32. The induction machine drive system of claim 31 wherein said error converter comprises:

a summer for subtracting said stator phase current value from a commanded current value to obtain an error term;

a regulator for converting said error term into a terminal voltage signal in synchronous reference frame;

a converter summer for adding said terminal voltage signal to an input parameter;

an integrator for converting an output of said converter summer into said commanded voltage value in synchronous reference frame.

33. The induction machine drive system of claim 32 wherein said regulator comprises a proportional integral differential regulator.

34. The induction machine drive system of claim 31 wherein said error converter comprises:

a regulator for converting said error term into a terminal voltage signal in synchronous reference frame; and a limiter for bounding said terminal voltage signal to produce said commanded voltage value in synchronous reference frame.

35. The induction machine drive system of claim 31 wherein said voltage transformer comprises:

a frequency multiplier for multiplying said commanded voltage value in synchronous reference frame with a machine dependent constant to obtain a frequency value;

a frequency integrator for integrating said frequency value to obtain an electrical angle;

an exponential operator to generate an exponential function of said electrical angle; and a vector multiplier for multiplying said commanded voltage value by said exponential function to produce said commanded voltage vector in stationary reference frame.

* * * * *